United States Patent
Bacon

[11] 3,805,844
[45] Apr. 23, 1974

[54] PLUGGING DEVICE FOR PIPE LINES

[76] Inventor: Vincent S. Bacon, 3835 Fairway Dr., Canfield, Ohio 44406

[22] Filed: Dec. 29, 1972

[21] Appl. No.: 319,376

[52] U.S. Cl. .................................. 138/93, 138/94
[51] Int. Cl. .......................................... F16l 55/10
[58] Field of Search .......... 73/49.8; 138/89, 93, 94, 138/97, 99; 220/46 P; 277/34, 34.3, 34.6

[56] References Cited
UNITED STATES PATENTS

| 2,378,367 | 6/1945 | Ahern | 138/93 |
| 2,552,901 | 5/1951 | Miller | 138/94 X |
| 2,811,985 | 11/1957 | Wells | 138/93 |
| 3,695,301 | 10/1972 | Pittman | 138/97 |

Primary Examiner—Charles A. Ruehl
Attorney, Agent, or Firm—Webster B. Harpman

[57] ABSTRACT

A plugging device for a pipe line having means for tapping the pipe line and inserting a collasped expansible bag thereinto temporarily expanded with water to force the bag into contact with the pipe where it may be frozen by creation of freezing temperatures thereabout so as to plug the pipe line temporarily.

5 Claims, 2 Drawing Figures

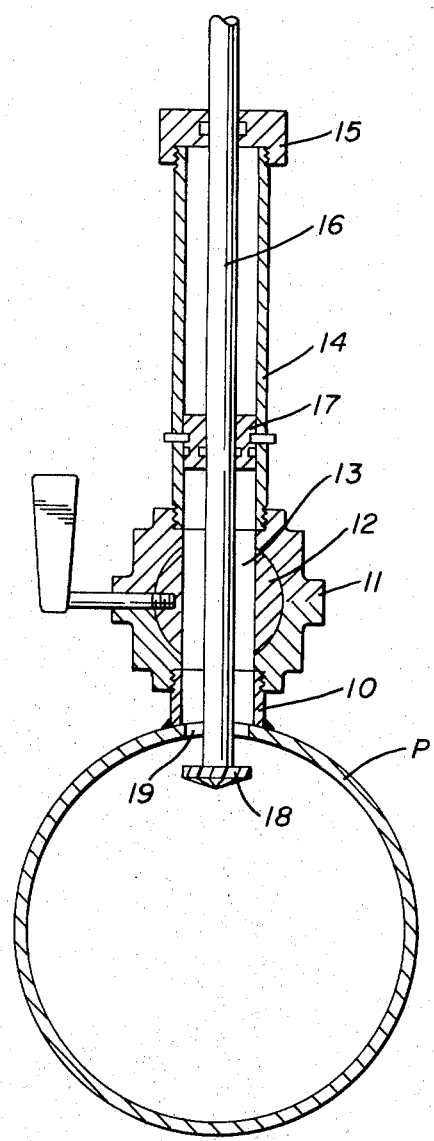
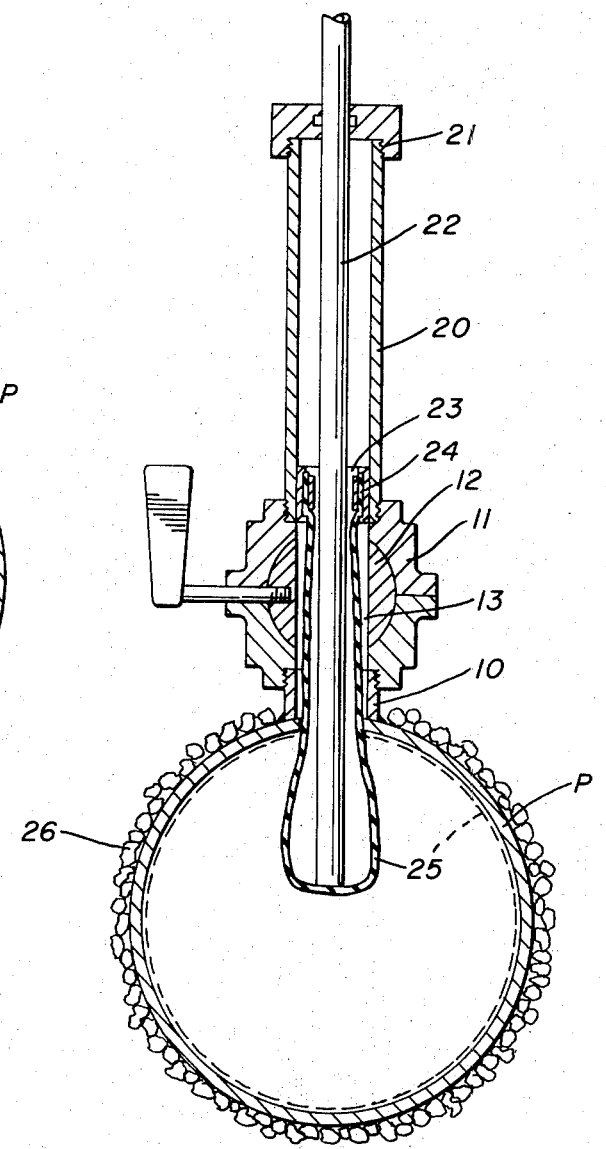
FIG. 1
FIG. 2

PLUGGING DEVICE FOR PIPE LINES

BACKGROUND OF THE INVENTION

1. Field of the Invention

This invention relates to devices for plugging pipe lines so as to isolate a section thereof for repair or replacement.

2. Description of the Prior Art

Devices heretofore used have included plugs insertable in the pipe lines and bags insertable in the pipe line and filled with magnetizable metal particles (see for example U.S. Pat. No. 3,298,398 of Jan., 1967).

This invention eliminates the problems encountered with the prior art devices and provides a simple, readily workable, quickly effective means of temporarily plugging a pipe line.

SUMMARY OF THE INVENTION

A plugging device for a pipe line consists of a tapping tool including a hollow barrel and a valve therein attachable to the pipe line, the tapping tool being operable through the hollow barrel to form an opening in the pipe line at the point to be plugged. A device similar to the tapping tool introduces a collasped, expansible bag into the pipe line where it is filled with water under pressure to expand the same into contact with the pipe and dry ice is positioned around the exterior of the pipe to freeze the water to form a solid blocking plug.

DESCRIPTION OF THE DRAWINGS

FIG. 1 is a side elevation in longitudinal section illustrating the device for cutting a hole in the pipe line.

FIG. 2 is a side elevation in longitudinal section illustrating the insertion of an expansible bag into the pipe line. Broken lines in FIG. 2 illustrate the water-filled expanded bag.

DESCRIPTION OF THE PREFERRED EMBODIMENT

In its preferred form the plugging device for pipe lines of this invention consists of a nipple 10 weldable to the exterior of a pipe line, a tapping valve 11 threadably engaging the nipple 10 and having a movable valve element 12 therein designed to provide a large smooth bore passage 13 therethrough when in open position. A cylinder 14 is threadably engaged in the upper end of the tapping valve 11 and the upper end thereof is closed by an apertured cap 15. A drill rod 16 is positioned through the apertured cap 15 and extends downwardly in the cylinder 14 and through a gland 17 therein and extends through the passage 13 in the valve element 12 of the tapping valve 11 and into contact with a pipe P in which a temporary plug is to be positioned. A cutter 18 on the end of the drill rod 16 will cut an opening in the pipe P when the drill rod is revolved and moved downwardly as will be understood by those skilled in the art. When the opening, indicated by the numeral 19 in FIG. 1 of the drawings, is formed the drill rod 16 and the cutter 18 thereon is retracted vertically, the valve element 12 closed and the cylinder 14 removed from the tapping valve 11.

By referring now to FIG. 2 of the drawings it will be seen that a secondary cylinder 20 is then installed on the tapping valve 11. The secondary cylinder 20 has an apertured cap 21 at its upper end through which a pipe 22 is positioned so as to extend downwardly through the secondary cylinder 20. A collar 23 is attached to the pipe 22 and the neck 24 of an expansible bag 25 is secured to the collar 23 with the bag 25 in its collasped state extending down and around the end of the pipe 22.

The pipe 22 with the collar 23 and the expansible bag 25 is moved downwardly through the passageway 13 in the valve element 12 of the tapping valve 11 and into the interior of the pipe P to be plugged. When the bag 25 is partially within the pipe P, water under pressure is introduced through the pipe 22 thereinto so as to expand the same into the position shown in broken lines in FIG. 2 where it completely fills the pipe P. Dry ice 26 is then positioned around the exterior of the pipe P immediately adjacent the water-filled expansible bag 25 so as to freeze the same and form a solid plug in the pipe P.

It will occur to those skilled in the art that a section of a pipe line can be isolated for repair or replacement by installing a pair of the devices disclosed herein, one on either side of the repair or replacement section and when the repair or replacement is complete the devices may be removed and the tapping valves closed, thus restoring the pipe line to normal operational capabilities.

The plugging device for pipe lines disclosed herein forms a simple, easily operated device in which operational pressures may be attained matching those in the pipe line being temporarily plugged so as to insure the successful operation thereof.

Although but one embodiment of the present invention has been illustrated and described, it will be apparent to those skilled in the art that various changes and modifications may be made therein without departing from the spirit of the invention.

I claim:

1. A device for plugging a pipe and consisting of an expansible bag, means for inserting said bag into said pipe through an opening therein, said means communicating with said expansible bag for introducing water thereinto under pressure so as to expand the same into contact with said pipe and means exteriorly of said pipe for creating freezing temperatures in the water in said expansible bag so as to freeze the same.

2. The device for plugging a pipe set forth in claim 1 and wherein the means for inserting the expansible bag includes a valve in communication with said pipe, a cylinder on said valve, a tube movably positioned through said cylinder and valve, said expansible bag secured to said tube.

3. The device for plugging a pipe set forth in claim 2 including pressure sealing means between said movable tube and said cylinder.

4. The device for plugging a pipe set forth in claim 1 and wherein means for inserting said expansible bag consists of a nipple attached to said pipe, said opening registering with said nipple, a valve having a through bore valve element attached to said nipple, a tube positioned axially of said valve and nipple, said expansible bag having a neck secured about said tube and means for introducing fluid into said tube and bag.

5. The device for plugging a pipe set forth in claim 1 and wherein said expansible bag is flexible and impervious.

* * * * *